United States Patent [19]
Messervey et al.

[11] 3,750,458
[45] Aug. 7, 1973

[54] HIGH PRESSURE CAN TESTING APPARATUS

[75] Inventors: Clifford Harry Messervey, East Randolph; Maynard Harry Riddell, Randolph, both of N.Y.

[73] Assignee: Borden, Inc., New York, N.Y.

[22] Filed: Dec. 23, 1970

[21] Appl. No.: 100,892

[52] U.S. Cl. .............................................. 73/45.1
[51] Int. Cl. .......................................... G01m 3/02
[58] Field of Search.................. 73/45.1, 45.2, 45.4, 73/41

[56] References Cited
UNITED STATES PATENTS
2,112,536   3/1938   Krueger ............................... 73/45.2
3,198,004   8/1965   Roberts ................................ 73/45.1

Primary Examiner—Richard C. Queisser
Assistant Examiner—Denis E. Corr
Attorney—George P. Maskas, Edward L. Mandell and George A. Kap

[57] ABSTRACT

The apparatus includes a plurality of chambers in association with a spider wheel for receiving cans to be tested, means for supplying pressurized gas into the cans disposed in the chambers, sensing means in communication with the chambers for detecting gas leaking out of the cans, three-way spool valves interposed between the chambers and the supply means, two-way spool valves interposed between the sensing means and the chamber, means for actuating the three-way valve to a closed position when a chamber is empty so as not to pressurize needlessly an empty chamber and means for bleeding the gas from the sensing means.

14 Claims, 6 Drawing Figures

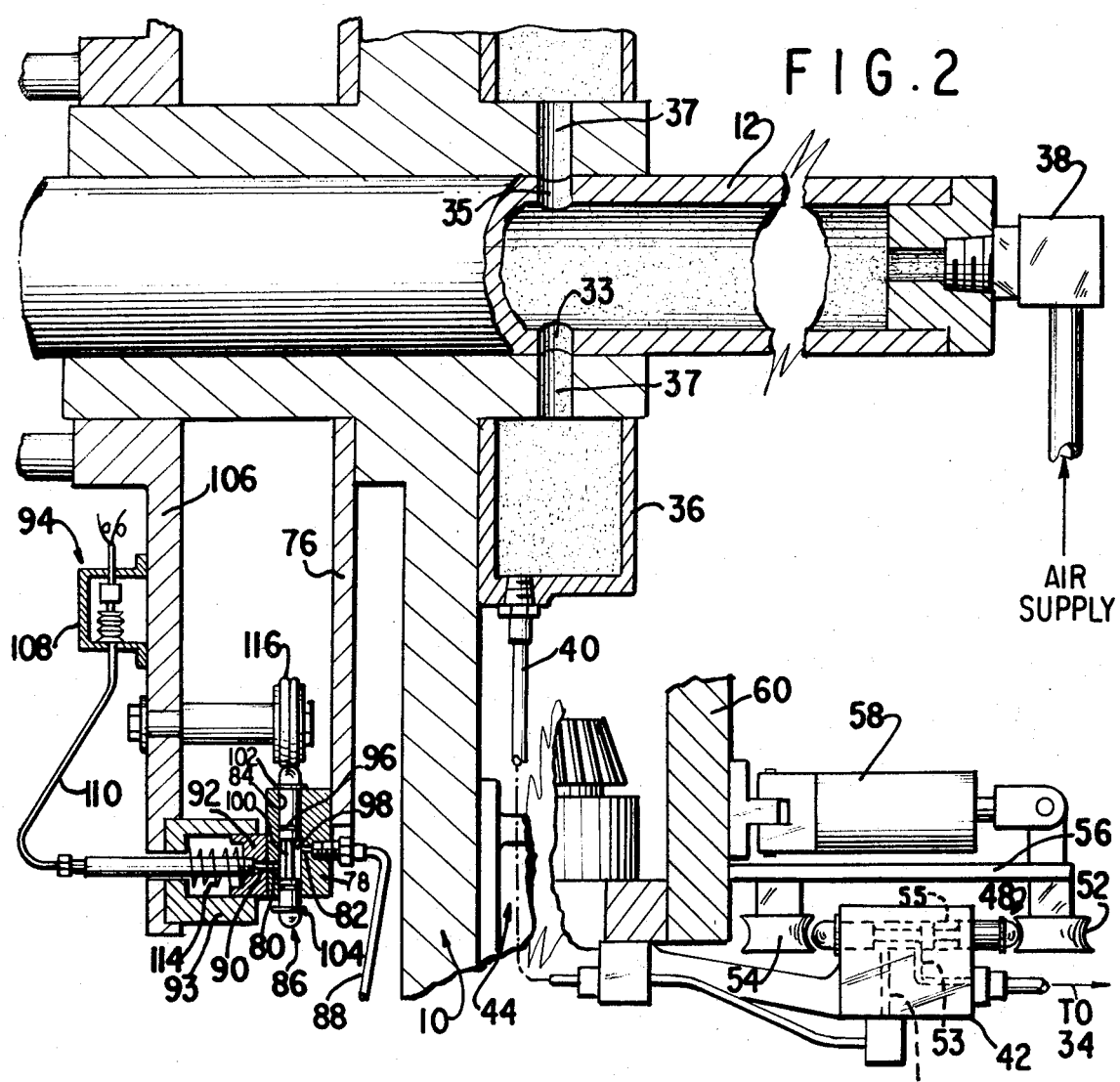

INVENTORS
MAYNARD RIDDELL
CLIFFORD H. MESSERVEY
BY
ATTORNEY

HIGH PRESSURE CAN TESTING APPARATUS

This invention relates to can testing apparatus which can be used to test containers at low pressures whenever desired, as well as at high pressures whenever the type and construction of the container lends itself to high pressure testing.

The novel apparatus includes a plurality of chambers associated with a rotatable spider wheel for receiving cans to be tested; an air injection station where test air under pressure is blown into the can; a leak detecting station where air leaking from the can, if the can is faulty, is sensed and a mechanism is triggered to reject the faulty can; can discharge station for separately discharging leak-proof and faulty cans; a first set of spool valves rotatable with the spider wheel, corresponding in number to the number of chambers, permit passage of pressurized air into the cans intermittently as each spool valve comes into communication with the air injecton station; and a second set of spool valves also rotatable with the spider wheel, corresponding in number to the number of chambers, serve to convey air leaking from a faulty can to a leak detector when each spool valve comes to a predetermined position at the leak detection station. This apparatus permits testing of cans at pressures much higher than the pressures that can be controlled and sealed by flat valves of the disk type.

Heretofore, numerous testing apparatus have been devised to detect leaks in continuously supplied cans by positioning and sealing each can into one of a plurality of cylindrical chambers spaced around a rotatable spider while injecting gas under pressure into the can and measuring the pressure build-up in the chamber occasioned by gas seepage through the can walls. Conventional sensing apparatus is used to detect pressure changes in the chamber and to convey an appropriate signal to the sorting mechanism of the testing machine to reject the leaky cans.

Roberts et al. U.S. Pat. No. 3,198,004 describes a can testing apparatus which includes a spider wheel mounted on a shaft rotatable through stations arranged in arcuate sequence on the spider wheel. A plurality of test pockets or containers, forming chambers for the cans, are affixed to the spider wheel. The stations include a can receiving station where the cans are placed into the chambers; an air injection station where air under pressure is injected into the cans; a can testing station where air pressure build-up, due to air leaking from the can if the can is faulty, is detected; and a can discharge station where leak-proof and leaky cans are separately discharged from the can testing apparatus. Pressurized air is injected into the can through a first disk valve and air from a leaking can is conveyed to a detector through a second disk valve. The disk valves include a stationary ring and a rotating ring. Since the disk valves are subjected to substantially continuous rotary use, it has been the practice in the past to lubricate the abutting faces of the rings with a suitable hydrocarbon lubricant. While the lubrication function has been adequate, it very often happened that the lubricant entered the air lines and was introduced, together with the air, into the cans that were tested. This is manifestly undesirable since it requires additional inspection of the cans to make sure that they are free of the lubricant before they are sent to be filled.

Roberts et al. U.S. Pat. No. 3,198,004 overcame the lubrication problem by positioning a flat circular sheet of material, such as Teflon$^T$, between the cooperating rings of the disk valves. Since coefficient of friction of Teflon$^T$ is very small, it serves admirably as a lubrication medium between the rings of the disk valves without causing any of the problems characteristic of the hydrocarbon lubricants.

Although the problem of lubricant contamination has been solved, experience has shown that contamination in the test air, or any abrasive material entering between the sealing faces of either the lubricated or the oilless type valve, can cause scoring of the sealing surfaces thus allowing the valves to leak. Renewal or replacement of the valves is costly.

Another problem associated with the Roberts et al. apparatus pertains to pressure at which air is injected into the cans. It has been discovered that Roberts et al. apparatus operates admirably well as long as the pressure of the air is kept below about 25 psi. If the pressure is increased above about 25 psi, the air blows the disk valves apart with consequent loss of test. Since the required test pressure for some cans is well above 25 psi, a solution to this problem was necessary in order to adapt Roberts et al can testing apparatus to testing of such cans as aerosol, beverage and beer cans, which require test pressures as high as, or higher than the pressures they will be subjected to after filling.

Improvements of the Roberts et al. can testing apparatus, described herein, relate to adaptation of the apparatus to operation at high air pressures and to elimination of replacing the disk type flat valves whenever scoring occures. With the improved can tester, rejection of the first three or four cans is avoided each time the tester is re-started, the rejection having been caused by movement of the sealing rubber pad, can swell, etc., during the period the can tester remains inoperative. When can tester is running with no cans in some pockets, the empty pockets do not receive air resulting in saving of air. For example, when a can tester is operating at 725 cans per minute and the cans are of average size, wasted air would amount to 22,715 cubic inches per minute at operating pressure. In the case of the old can tester, presence of test air in empty pockets would activate leak detecting switches and reject mechanism for each pocket while the tester is running empty. Again, for a tester running at 725 cans per minute there would be 7,250 unnecessary actuations for a 10-minute operating period. In the new can tester, one can received same balanced test as cans going through test cycle in continuous fashion, allowing the system to be in balance and also allowing can supply to be intermittent. The new can tester is safer from the point of view that in start-stop operation, tester can start automatically while someone has his hand in it; while in a continuously moving tester, it either runs or is stopped completely since there is no automatic start.

For a detailed description of the novel can testing apparatus, reference is hereby made to the drawings wherein, FIG. 1 is a fragmentary view in vertical section of a portion of the novel apparatus;

FIG. 2 is an enlarged view in cross-section of the valve ring and the spool valve;

FIG. 3 shows a three-way spool valve disposed in the bore of the spool valve bracket, the valve being in the open position allowing gas under pressure to enter interior of a can;

FIG. 4 shows the three-way spool valve in a closed position which allows the gas from the can to be vented to the atmosphere;

Figure 1:
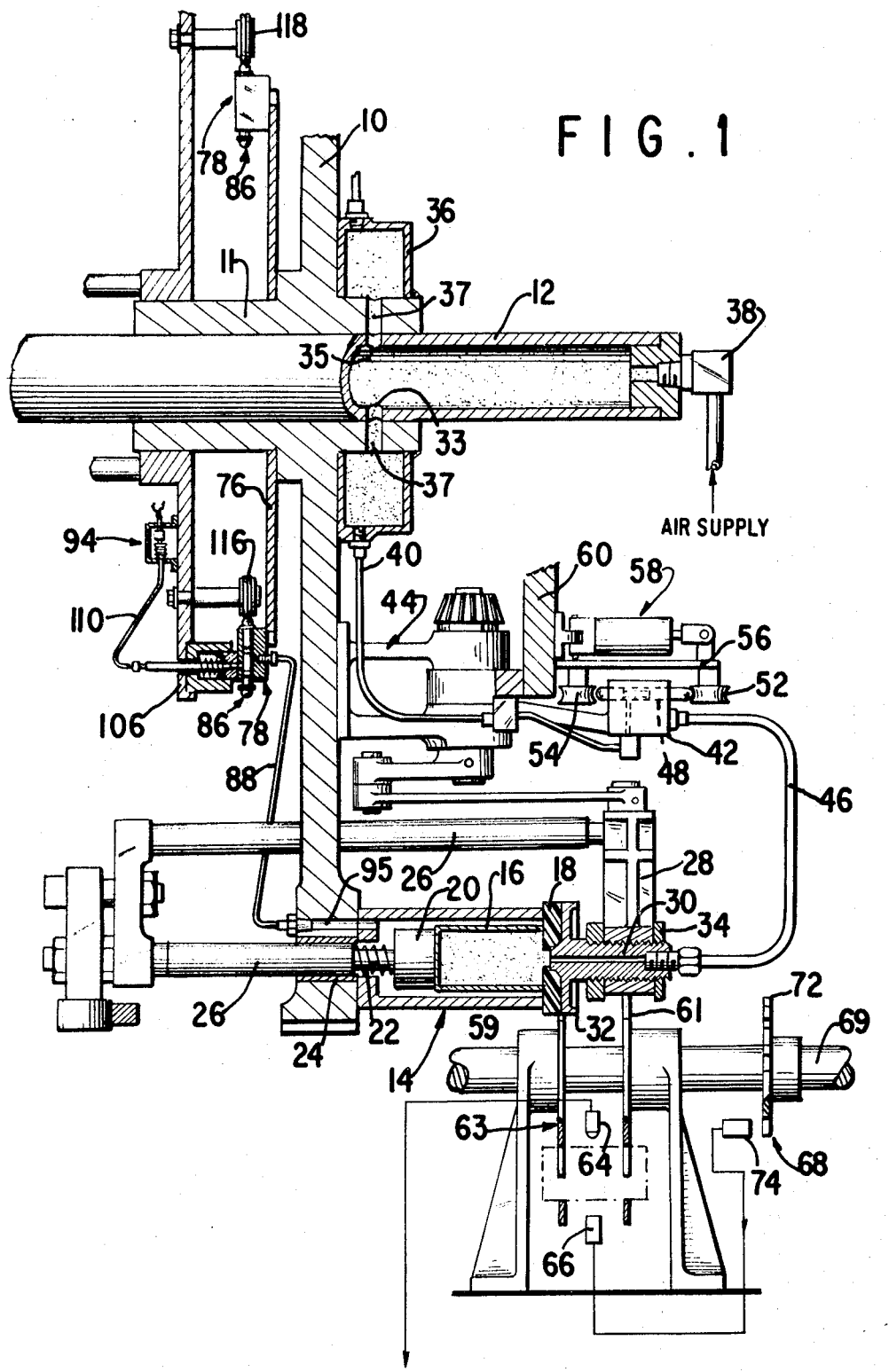

Referring now to the drawings, FIG. 1 shows a can testing apparatus comprising spider wheel 10 which is rotated on a shaft 12 through stations arranged around the spider wheel. a plurality of test pockets are affixed to the spider wheel 10 which are adapted to receive cans 16. One end of can 16 is open while the opposite end is provided with a cover. At the loading station, the open end of can 16 is pressed against rubber seal 18 while the opposite end of the can is held against plunger 20 which is biased against the can by spring 22 coiled around rod 24. The spring 22 is used in loading and unloading cans while the rubber pads in the test pockets are for sealing air in the cans. Rod 24 projects through the spider wheel into the interior test pocket where it is received with the plunger 20. Rod 24 is integrally associated with another rod 26 which is affixed to the supporting beam 28, which in turn, is secured to and actuates fitting 30 and its associated structure. Fitting 30 has a base 32 which supports rubber disk or seal 18. Port 34 traverses fitting 30 from one end to the other.

On the gas injection side of the apparatus, i.e., right hand side of FIG. 1, air swivel 38 is connected to hollow shaft 12. Air is admitted into air tank 36 through air swivel 38, hollow shaft 12, openings 33, 35 in hollow shaft and port 37 in hub 11. Air tank 36 is rigidly mounted on hub 11 and rotates therewith. One end of copper tubing 40 is secured to air tank 36 while the other end—to spool valve bracket 42. Rubber hose 46 is secured to the spool valve bracket 42 and to fitting 30 to convey gas under pressure from air tank 36 to interior of can 16 when spool valve 48 is in the open position. A plurality of spool valve brackets 42, corresponding to the number of test pockets 14, are mounted on castings 44 which are rigidly affixed to spider wheel 10.

In order to permit gas to enter interior of can 16, spool valve 48 must be in the open position, shown in FIG. 3 which shows a plurality of O-rings 41 disposed in grooves of spool valve 48 resting in the bore of spool valve bracket 42. This is a three way spool valve which has two recessed portions 43, 45 forming chambers 47,49 which are sealed in the bore of spool valve bracket 42 by means of O-rings 41. A pair of abutments 39, 39' limit travel of spool valve 48 in either direction. In its open position, chamber 47 of spool valve 48 is in communication with ports 51 and 53. Copper tubing 40 is secured to port 51 while rubber hose 46 is secured to port 53. Port 55, which is open to the atmosphere, is inoperative in the open position of the spool valve.

Closed position of spool valve 48 is illustrated in FIG. 4. Here, the spool valve has been shifted in the bore of spool valve bracket 42 so that ports 51 and 53 are sealed off from each other by the intermediate O-ring 41 to prevent any gas to enter interior of can 16, or chamber 14 if there is no can in the chamber. Since ports 53 and 55 are in communication with chamber 49, gas from can 16, or chamber 14 if there is no can in the chamber, can be exhaused through ports 53 and 55.

Actuation of spool valves 48 to the open or closed position on the air injection side of the apparatus is accomplished by bumper rolls 52, 54 mounted on bracket 56 which is secured to piston-cylinder arrangement 58, hereinafter referred to as piston 58. Piston 58 is affixed to stationary cam ring 60 and upon actuation, displaces in unison bumper rolls 52,54 in either one direction or the other, shown in FIG. 1, to shift spool valve 48 in the bore of the spool valve bracket 42 to either the closed or open position.

Piston 58 is actuated by an electrical signal from a solid state memory device, otherwise known as a shift register, 62. A detector, which can be a proximity switch or, as illustrated in FIG. 1, a photocell 64 and a light source 66, is mounted between disks 59, 61 of starwheel 63 provided with a plurality of flared cavities 65 which receive cans 16 from feed indexing spiral 67. Disks 59,61 are rotatably mounted on shaft 69, as evident from FIG. 1. The detector 64–66 is shielded between successive flared cavities 65 and is positioned so as to have the sides of the cans in the path of a light beam emitted by light source 66 as the cans rotate in the starwheel. When the detector senses presence of a can in cavity 65, no signal is conveyed to memory device 62 with the result that piston 58 is not actuated and the spool valve 48 remains open. When detector 64–66 senses absence of a can in cavity 65, a signal is received by memory device 62 which registers the signal in a first of several relay switches. The signal from the first switch is relayed to the next in response to a pulse from pulse generator 68 which consists of a rotatable disk mounted on shaft 69 having peripheral notches 72 and a stationary sensor 74. Every time a notch 72 traverses its path, sensor 74 conducts a pulse to memory device 62 whereby the registered signal is relayed to the next switch. When the signal reaches the last switch, this switch energizes a solenoid which actuates piston 58 to move spool valve 48 to a closed position, shown in FIG. 4, whereby passage of pressurized gas from air tank 36 to chamber 14 is prevented. Spring loaded valve, not shown, returns cylinder 58 to its original position once the empty chamber is passed.

It should be apparent now that the number of switches in memory device 62 will depend on the position of detector 64–66 and the position of piston 58. For a 48 pocket can tester, memory device is designed with 9 relay switches and 12 notches in the pulse generator. The number of notches in the pulse generator equals the number of flared cavities in starwheel 63. It should be understood that the pulse generator can be provided with only one notch, in which case, its rotation would be increased 12 times in order to produce a pulse for every advance of the starwheel.

Figure 5:
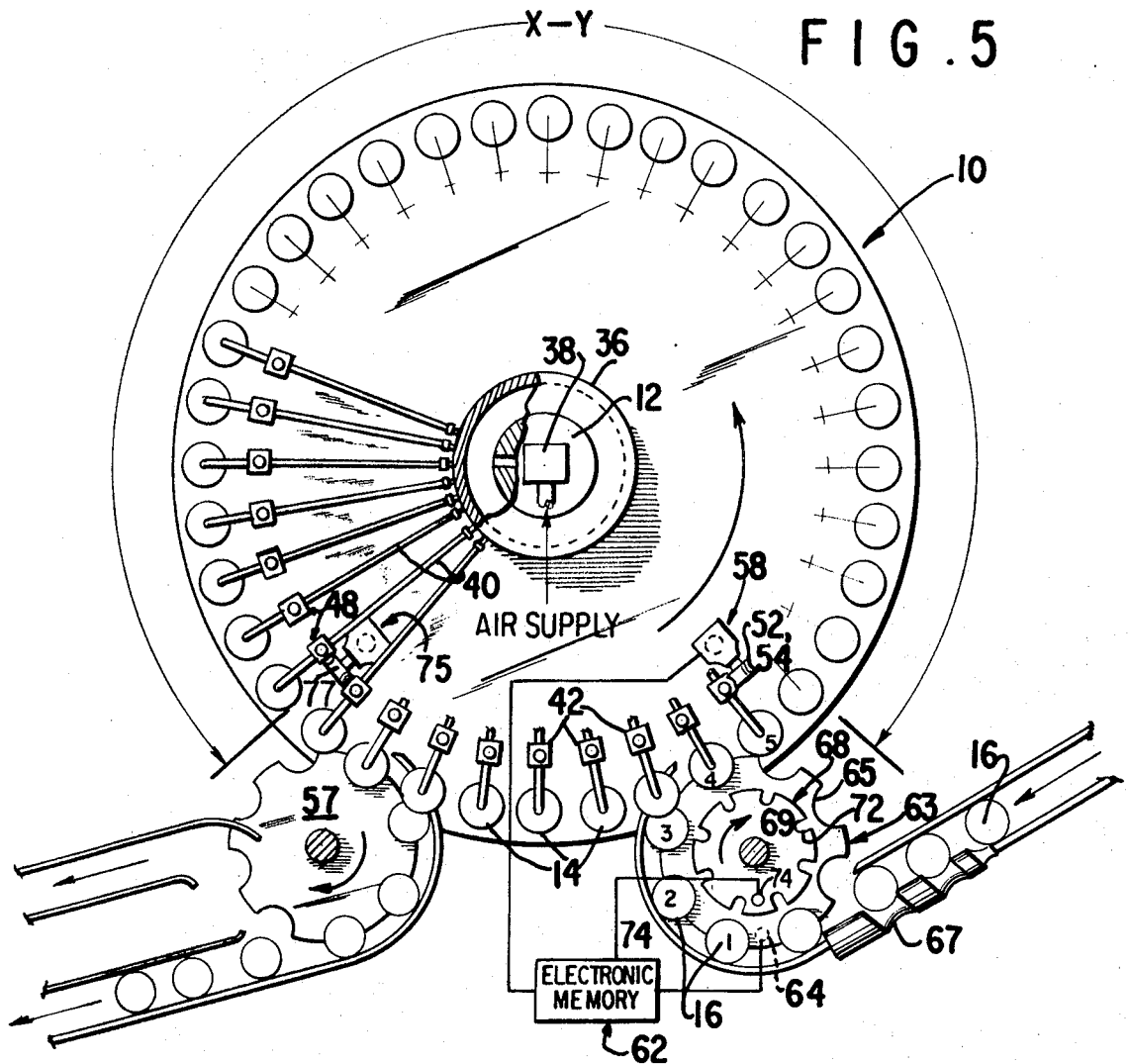
FIG. 5 is a side view of the apparatus illustrating feeding of cans to the can tester, the plurality of test pockets on the can tester arranged on a spider wheel and discharge of the cans from the can tester to a starwheel which separates leaky from leak-proof cans.

In order to clarify operation of the apparatus on the air injection side, let us assume that a can has been fed from feed indexing spiral 67 to starwheel 63. This can passes by detector 64–66 which, seeing the can in its cavity, remains inactive. This can, in position marked "1" in FIG. 5, is advanced by the starwheel to one of the can test pockets on the can tester. The can is placed into one of the can test pockets, sealed in chamber 14, as shown in FIG. 1, and advanced in counter-clockwise direction. Since memory device 62 did not receive any signal from detector 64–66, it does not actuate piston 58 and piston 58 maintains spool valve 48 in an open position which permits pressurized air to enter interior of the can. Pressurized gas in the can is held therein as the can travels through the arc X-Y, shown in FIG. 5, until the can reaches bracket 75. As will later become apparent, in its travel through arc X-Y, the can is subjected to the test to determine whether it is leaky or leak-proof.

When the can reaches bracket 75, spool valve 48 is moved to a closed position by stationary bumper roll 77 mounted on bracket 75, which closed position is illustrated in FIG. 4. In this position, pressurized gas to the can is shut off and the can interior is exhausted to the atmosphere through port 55. Spool valves remain in the closed position as they are conveyed from the position of bracket 75 to the position of piston 58. Since piston 58 is normally biased to maintain spool valve 48 in an open position, it will shift the spool valves to an open position as they encounter the bumper rolls.

Now let us assume that one of the cavities 65 in starwheel 63 is empty. When this empty cavity is indexed over the detector 64-66, a signal is generated and transmitted to memory device 62, which signal is registered by the first relay switch. As shaft 69 is rotated, sensor 74 sends pulses to the memory device every time it encounters a notch 72 in the pulse generator 68. Each pulse received from the sensor 74 advances the signal from one relay switch to another. When the last switch is reached, a solenoid actuates piston 58 to close spool valve 48 and thus shut flow of pressurized gas to the empty test pocket. Spool valve 48 remains in its closed position in its travel through arc X-Y and passed the position of bracket 75 until it is tripped to open position by piston 58.

On the leak detection side, i.e., the left hand portion of FIG. 1, a plate 76 is mounted for rotation on hub 11. A valve ring 78 is affixed to plate 76 in any convenient manner. Openings 80, 82 communicate with bores 84 which hold spool valves 86, and with air lines 88 and openings 90 in biased block 92. Passages 95 extend through test pockets 14 and spider wheel 10, and communicate with air lines 88. The spool valve 86 is similar to spool valve 48, however, whereas spool valve 48 is a three-way valve, spool valve 86 is a two-way valve. A plurality of O-rings 96 are provided to seal chamber 98 formed by recessed portion 100 of the spool valve. Abutments 102, 104 limit travel of the spool valve in either direction. Openings 80 in the valve ring 78 are so arranged on the valve ring that as the ring rotates, openings 80 successively communicate with openings 90 in block 92. The leak detector 94, being secured to the stationary plate 106, includes a housing 108 and a small diameter tube 110 which screws into block 92. Tube 110 communicates with leak detector 94 which detects air pressure build-up. Disposed between housing 93 and block 92 is spring 114 which biases block 92 into air-tight engagement with valve ring 78.

Figure 6:
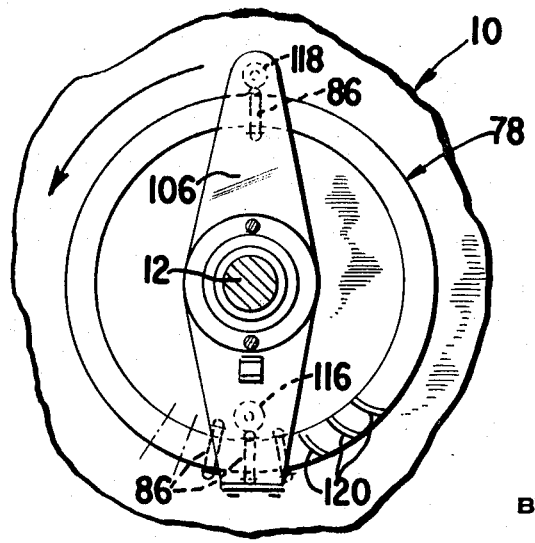
FIG. 6 is a front view of the valve ring showing disposition of the spool valves and the bumper rolls.

A pair of bumper rolls 116, 118, shown in FIG. 6, are affixed to the stationary [circular] plate 106 and function to displace the spool valve 86 either upwardly or downwardly. Grooves 120 in the valve ring 78 vent the leak detector to the atmosphere as valve ring 78 rotates and brings into alignment grooves 120 with opening 90.

In operation of the can testing apparatus, spider wheel 10 is rotated on shaft 12 carrying with it air tank 36, valve ring 78, which is secured to plate 76, and spool valve brackets 42 rigidly secured to spider wheel 10. Cans 16 are positioned within test pockets 14 by the cooperative movement of plunger 20 and fitting 30. Thus positioned, the can rim contacts rubber disk 18 to seal its interior from the environment of the test pocket. In its rotation on shaft 12, spool valve 48 comes in contact with one of the bumper rolls 52 or 54 and is displaced to a position where test pocket 14 is in communication with gas supply in air tank 36. In this position, air under pressure is introduced into the interior of can 16. Pressurized gas enters can 16 and if there is a leak, it seeps into the test pocket 14.

A number of degrees prior to the position shown in the left hand portion of FIG. 1, bumper roll 116 forces spool valve 86 into an open position where openings 80 and 82 are in communication through chamber 98. Further rotation of shaft 12 will bring the can testing apparatus in position shown in the left hand portion of FIG. 1 where the gas leaking from can 16, if any, is conveyed to leak detector 94 through passage 95, hose 88, passage through valve ring 78, block 92 and line 110. Leak detector 94 senses the gas pressure and activates a rejection mechanism, not shown, to discharge the faulty can into a separate hopper when the can is discharged to starwheel 57. Once the position of leak detecting side shown in FIG. 1 is passed, gas in the test pockets 14 is vented to the atmosphere by exposing openings 80 to the atmosphere when bumper roll 118 displaces spool valves 86. Interior of the can is vented when spool valve 48 encounters bumper roll 77 which shifts the spool valve to the closed position, shown in FIG. 5. Pressure in the leak detector 94 is maintained until opening 90 traverses grooves 120 in the valve ring 78, which also vent leak detector to the atmosphere.

I claim:

1. Apparatus for detecting can leakage comprising conveyor means for moving cans from a can charging station to a can discharging station; a plurality of test pockets provided on said conveyor means; means for charging cans into the test pockets; means for sealing the interior of the cans from the environment of the test pockets and the environment of the test pockets from the atmospheric environment; means for injecting gas under pressure into the interior of the cans; conduit means between the gas injection means and the cans, for conveying gas from the injection means to the can; a first series of spool valves interposed between the gas injection means and the test pockets for opening or closing the conduit means to passage of gas therethrough; stationary means for sensing pressure increase in the test pocket; conduit means between the sensing means and the test pockets for conveying gas from the test pocket to the sensing means; and a second series of spool valves interposed between the test pockets and the sensing means for opening or closing the conduit means to passage of gas therethrough.

2. Apparatus of claim 1 including a rotatable shaft and a valve ring for operatively receiving said second series of spool valves, the conveyor means being a spider wheel mounted on the shaft for rotation therewith.

3. Apparatus of claim 2 wherein first and second series of valves are mounted on both sides of the spider wheel for rotation therewith, the first series of spool valves being rotatably disposed on the gas injection side of the apparatus while the second series of spool valves being operatively disposed in transverse bores of the valve ring disposed on the leak detection side of the apparatus.

4. Apparatus of claim 3 wherein the first series of spool valves on the air injection side includes two recessed portions in each of the spool valves forming chambers within the bore, said apparatus including a pair of passages communicating with one of the chambers when the spool valve is in the open position to allow the gas to pass through the valve ring into a can, a third passage in communication with one of the chambers to allow exhausting of the test gas from the can when the spool valve is in the closed position and means for displacing the first series of spool valves into open and closed positions; and wherein on the leak detection side, the second series of spool valves includes a recess forming a chamber within the bore, said apparatus including a pair of passages in communication with the chamber to permit leaking gas from a can to pass to the sensing means and means for displacing the second series of spool valves into open and closed positions.

5. Apparatus of claim 4 wherein the number of spool valves in the first and second series is equivalent, the number corresponding to the number of test pockets on the apparatus.

6. Apparatus of claim 5 wherein spool valves on the gas injection side are three-way valves, the apparatus comprising means for displacing spool valves on the gas injection side which includes a pair of abutments, means for displacing the pair of abutments to a position to either open or close the spool valves, means for actuating the pair of abutments in unison, and a single abutment rigidly mounted at a point spaced from the pair of abutments and passed the station where the leak detection test is made, for displacing the spool valves to a closed position to allow the can to be vented; and wherein said apparatus also includes means for displacing spool valves on the leak detection side, these valves being two-way valves, the displacing means including a first abutment rigidly mounted on the leak detection side at a point between the pair of abutments and the single abutment on the gas injection side, the first abutment serving to open the two-way spool valves to permit communication between the test pockets and the sensing means; and a second abutment spaced from the first abutment for moving the two-way spool valves to a closed position.

7. Apparatus of claim 6 wherein on the gas detection side, the pressure sensing means is in airtight, slidable engagement with the valve ring, the openings on one side of the valve ring come into successive alignment with the sensing means while the openings on the opposite side of the valve ring are in operative engagement with the conduit means between the sensing means and the test pockets.

8. Apparatus of claim 6 including means having a plurality of cavities for feeding cans to the conveying means, the cavities being provided for reception of cans; means for detecting absence of a can in a cavity; means for actuating the pair of abutments on the gas injection side to move the three-way spool valves to a closed position in response to a signal from the detecting means.

9. Apparatus of claim 8 wherein said actuating means is a shift register having a plurality of relay stations, the number of stations being related to position of the two abutments in order to time actuation of the two abutments when an empty test pocket arrives to receive pressurized gas into empty test pocket.

10. Apparatus of claim 9 including a rotatable pulse generator in association with said shift register whose movement is synchronized with movement of the can feeding means, the pulse generator being provided for the purpose of producing pulses in response to movement of the cavities in the can feeding means which pulses are conveyed to said shift register to relay the signal from the first station to the last.

11. Apparatus for detecting can leakage comprising conveyor means for moving cans from a can charging station to a can discharging station; a plurality of test pockets on the conveyor means; means for charging cans into the test pockets; means for sealing the interior of the cans from the environment of the test pockets and the environment of the test pockets from the atmospheric environment; means for injecting gas under pressure into the interior of the cans; first series of spool valves interposed between the gas injection means and the test pockets for controlling passage of gas into cans disposed in test pockets; means for sensing pressure increase in the test pockets; and a second series of spool valves interposed between the test pockets and the sensing means for controlling passage of gas from the test pockets to the sensing means.

12. Apparatus of claim 11 including a first valve ring for receiving the first series of spool valves and a second valve ring for receiving the second series of spool valves, the first and second valve rings are mounted on the conveyor means, the conveyor means including a shaft and a spider wheel mounted on the shaft for rotation therewith.

13. Apparatus of claim 12 including three passages in the first valve ring for each of the spool valves, one being in communication with the gas injection means, another being in communication with interior of a can being tested and the third passage leading to the atmosphere; two recessed portions on each of the spool valves of the first series forming chambers with the first valve ring, with two of the passages being in communication with one of the chambers at a time depending whether the spool valve is in an open or closed position; means for displacing the first series of spool valves to an open or closed position; a recess in each of the spool valves of the second series forming a chamber with the second valve ring; a pair of passages in the second valve ring for each of the spool valves which permit leaking gas from the test pockets to pass to the sensing means; and means for displacing the second series of spool valves to an open or closed position.

14. Apparatus of claim 13 wherein the displacing means for the first series of spool valves includes a pair of stationary abutments on the gas injection side with the spool valves being disposed therebetween as they rotate with the first valve ring; means for displacing in unison the pair of abutments to a position for either opening or closing the spool valves; a single stationary abutment mounted on the same side as but at a point spaced from the pair of abutments and beyond the station where the leak test is made, the single abutment being provided for displacing the spool valves to a closed position so as to allow the interior of the cans to be vented; second means for displacing the second series of spool valves disposed on the leak detection side, this displacing means including a first stationary abutment mounted on the leak detection side between the pair of abutments and the single abutment on the gas injection side and second abutment spaced from the first abutment also disposed on the leak detection side, the first abutment serving to open spool valves while the second abutment serving to close the spool valves.

* * * * *